US009390721B2

(12) United States Patent
Daimou et al.

(10) Patent No.: US 9,390,721 B2
(45) Date of Patent: Jul. 12, 2016

(54) SPEECH DECODING DEVICE AND SPEECH DECODING METHOD

(71) Applicant: Panasonic Intellectual Property Corporation of America, Torrance, CA (US)

(72) Inventors: Katsunori Daimou, Hyogo (JP); Masahiro Oshikiri, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 92 days.

(21) Appl. No.: 14/370,080

(22) PCT Filed: Dec. 20, 2012

(86) PCT No.: PCT/JP2012/008156
§ 371 (c)(1),
(2) Date: Jul. 1, 2014

(87) PCT Pub. No.: WO2013/108343
PCT Pub. Date: Jul. 25, 2013

(65) Prior Publication Data

US 2014/0343932 A1 Nov. 20, 2014

(30) Foreign Application Priority Data

Jan. 20, 2012 (JP) ................................ 2012-010264

(51) Int. Cl.
*G10L 21/00* (2013.01)
*G10L 15/00* (2013.01)
(Continued)

(52) U.S. Cl.
CPC ............... *G10L 19/26* (2013.01); *G10L 19/002* (2013.01); *G10L 21/038* (2013.01); *G10L 19/24* (2013.01)

(58) Field of Classification Search
CPC . G10L 19/0204; G10L 20/0204; G10L 20/02; G10L 15/02; G10L 19/005
USPC .......... 704/205, 219, 500, 213, 212, 215, 216
See application file for complete search history.

(56) References Cited

U.S. PATENT DOCUMENTS

2004/0138876 A1 7/2004 Kallio et al.
2008/0281587 A1* 11/2008 Yoshida ................. G10L 19/12 704/223

(Continued)

FOREIGN PATENT DOCUMENTS

JP 08-202399 8/1996
WO 2008/066071 6/2008

(Continued)

OTHER PUBLICATIONS

"Recommendation ITU-T G.718, Amendment 2: New Annex B on superwideband scalable extension for ITU-T G.718 and corrections to main body fixed-point C-code and description text", Mar. 2010.

(Continued)

*Primary Examiner* — Akwasi M Sarpong
(74) *Attorney, Agent, or Firm* — Greenblum & Bernstein, P.L.C.

(57) ABSTRACT

The present invention pertains to a speech decoding device that is capable of preventing degradation in sound quality associated with an adjustment of the slope of a spectrum of an output signal (a decoding signal), making it less likely that a loss of bandwidth sensitivity due to the attenuation of a higher band region is perceived. For each frame of the bandwidth extension layer decoding signal, a filter assessment unit (304) determines whether or not to apply a low-pass filter to the bandwidth extension layer decoding signal on the basis of a change in energy in the bandwidth extension layer decoding signal. A low-pass filtering unit (306) filters the bandwidth extension layer decoding signal of the frames to which the low-pass filter is to be applied, as determined by the filter assessment unit (304), using the low-pass filter.

3 Claims, 7 Drawing Sheets

(51) Int. Cl.

| | |
|---|---|
| ***G06F 17/20*** | (2006.01) |
| ***G10L 15/04*** | (2013.01) |
| ***G10L 13/06*** | (2013.01) |
| ***G10L 15/20*** | (2006.01) |
| ***G10L 15/10*** | (2006.01) |
| ***G10L 15/197*** | (2013.01) |
| ***G10L 19/26*** | (2013.01) |
| ***G10L 21/038*** | (2013.01) |
| ***G10L 19/002*** | (2013.01) |
| *G10L 19/24* | (2013.01) |

(56) References Cited

U.S. PATENT DOCUMENTS

2009/0016426 A1* 1/2009 Sato ........................ G10L 19/24 375/240
2009/0157413 A1* 6/2009 Oshikiri .................. G10L 19/04 704/501
2010/0017197 A1* 1/2010 Oshikiri .............. G10L 19/0204 704/205
2010/0076755 A1* 3/2010 Morii .................... G10L 21/038 704/220
2010/0098199 A1* 4/2010 Oshikiri .................. G10L 19/26 375/350
2010/0100373 A1* 4/2010 Ehara ...................... G10L 19/26 704/219
2011/0257984 A1* 10/2011 Virette .................... G10L 19/26 704/503
2011/0320193 A1* 12/2011 Morii ...................... G10L 19/24 704/201
2013/0013300 A1* 1/2013 Otani .................... G10L 21/038 704/205

FOREIGN PATENT DOCUMENTS

WO 2008/108082 9/2008
WO 2008/120438 10/2008
WO 2011/121782 10/2011

OTHER PUBLICATIONS

"3GPP TS 26.290", V6.3.0, AMR-WB + Specification, Jun. 2005.
Search report from PCT/JP2012/008156, mail date is Jan. 29, 2013.
Search report from E.P.O., mail date is May 27, 2015.

* cited by examiner

SPEECH DECODING DEVICE AND SPEECH DECODING METHOD

TECHNICAL FIELD

The present invention relates to a speech decoding apparatus and a speech decoding method that have a scalable configuration, for example.

BACKGROUND ART

Mobile communication systems are required to transmit speech signals compressed at a low bit rate for effective utilization of radio wave resources or the like. Meanwhile, mobile communication systems are also required to realize quality improvement of call speech or call services with a high level of realism. In order to realize the quality improvement and call services, it is preferable to encode wider band speech signals or music signals or the like with high quality.

To respond to these two mutually contradictory demands, a technique that integrates a plurality of encoding techniques hierarchically is regarded as promising. This technique hierarchically combines a first layer that encodes an input signal up to a wideband (0 to 7 kHz) with a band extension layer that uses the input signal and a decoded signal of the first layer to perform encoding up to ultra-wideband (0 to 14 kHz).

In the following description, a signal band (0 to 7 kHz) encoded in the first layer is called a “wideband region” and a signal band (7 kHz to 14 kHz) encoded in a band extension layer is called an “extension band region.” FIG. 1 illustrates the wideband region and the extension band region in an input signal spectrum. Thus, in the technique that hierarchically performs encoding, a bit stream obtained from an coding apparatus has scalability, that is, the nature that a decoded signal can be acquired even from information of parts of a bit stream, and therefore the technique is generally called “scalable encoding (hierarchic encoding).”

Since the scalable coding scheme can flexibly respond to communication between networks of different bit rates based on its own nature, the scalable coding scheme can be said to be suitable for future network environments in which a variety of networks are integrated using IP protocols.

There is a technique disclosed in NPL 1 as an example of realizing scalable encoding using a technique standardized in ITU-T (International Telecommunication Union Telecommunication Standardization Sector). This technique encodes signals of the wideband region in the first layer and performs encoding in the band extension layer by extending signals of the extension band region using the signals of the wideband region.

Using such a scalable configuration makes it possible to achieve speech signals and music signals having a wider band than speech signals of high quality.

However, when encoding is performed at a low bit rate, since fewer bits are assigned to the band extension layer, the output signal (decoded signal) produces a sound quality quite offensive to the ear (a feeling of abnormal sound). In such a case where only fewer bits are assigned to a certain frequency band, a scheme may be adopted whereby abnormal sounds are reduced by limiting the frequency band of the output signal in accordance with the bit rate and intensively assigning bits to the remaining band (NPL 2). However, at the same time, there is also a drawback in that the band limitation impairs a feeling of clarity (a feeling of bandwidth) and degrades subjective quality. That is, when the above-described band limiting scheme is adopted, a feeling of abnormal sound and a feeling of bandwidth are in a trade-off relationship.

In order to avoid the above-described problems, a scheme may be considered which applies a low-pass filter having a moderate characteristic for an output signal instead of completely limiting the bandwidth of the above-described output signal and causes the high-band energy to attenuate so as to reduce abnormal sounds while maintaining a feeling of bandwidth. In that case, it is preferable to adaptively switch filter coefficients in accordance with characteristics of the (output) signal. PTL 1 is an example of the scheme for adaptively switching filter coefficients. This is a scheme that adjusts coefficients of a high band emphasis filter in accordance with the ratio of high-band energy in high band emphasis processing of a post filter and weakens the high band emphasis when the energy ratio is high. This makes it possible to design a filter with appropriate intensity in accordance with characteristics of a signal (decoded signal) inputted to the filter and limit a feeling of abnormal sound while maintaining a feeling of bandwidth to a certain degree.

CITATION LIST

Patent Literature

PTL 1
Japanese Patent Application Laid-Open No. HEI 8-202399

Non-Patent Literature

NPL 1
Recommendation ITU-T G718 AnnexB, March, 2010
NPL 2
3GPP TS 26.290 (June, 2005) (AMR-WB+Specification)

SUMMARY OF INVENTION

Technical Problem

However, in PTL 1, a spectral tilt of a signal in the low-frequency region is changed to adjust an overall spectral tilt of the output signal. That is, when this configuration is applied to the scalable coding scheme, spectral tilts of both the wideband region and the extension band region are changed. The scalable coding scheme generally assigns more bits to the wideband region which is perceptually important to thereby improve encoding quality of the wideband region, so that adjusting the spectral tilt of the wideband region may cause degradation of sound quality.

In PTL 1, filter coefficients are adjusted based on the ratio of the high-band energy and filter processing is performed in all frames, and therefore if a signal whose overall high-band energy is high is inputted, a state with weak high band emphasis continues for a long time. Thus, a loss of feeling of bandwidth associated with the attenuation of the high-band region is more likely to be perceived, resulting in a problem in that the sound is heard like a muffled sound. Especially, female voices contain a relatively high ratio of high-band region energy and degradation of sound quality is noticeable.

An object of the present invention is to provide a speech decoding apparatus and a speech decoding method capable of preventing degradation of sound quality associated with an adjustment of the spectral tilt of an output signal (decoded signal) and making less perceptible a loss of feeling of bandwidth due to attenuation of the high-band region.

Solution to Problem

A speech decoding apparatus according to an aspect of the present invention includes: an acquiring section that acquires first layer coded data obtained by encoding a speech signal of a wideband region and band extension layer coded data obtained by encoding a speech signal of an extension band region that is a higher band than the wideband region; a decoding section that decodes the first layer coded data acquired by the acquiring section to generate a first layer decoded signal and decodes the band extension layer coded data acquired by the acquiring section to generate a band extension layer decoded signal; a determining section that determines for each predetermined period of the band extension layer decoded signal whether or not to apply a low-pass filter to the band extension layer decoded signal based on an energy change of the band extension layer decoded signal; and a filter processing section that performs filter processing on the band extension layer decoded signal of the predetermined period to which the low-pass filter is determined by the determining section to be applied.

A speech decoding method according to an aspect of the present invention includes: acquiring first layer coded data obtained by encoding a speech signal in a wideband region and band extension layer coded data obtained by encoding a speech signal in an extension band region which is higher band than the wideband region; decoding the acquired first layer coded data to generate a first layer decoded signal and decoding the acquired band extension layer coded data to generate a band extension layer decoded signal; determining for each predetermined period of the band extension layer decoded signal whether or not to apply a low-pass filter to the band extension layer decoded signal based on an energy change of the band extension layer decoded signal; and performing filter processing on the band extension layer decoded signal of the predetermined period to which the low-pass filter is determined to be applied.

Advantageous Effects of Invention

According to the present invention, it is possible to prevent degradation of sound quality associated with an adjustment of the spectral tilt of an output signal (decoded signal) and make less perceptible a loss of feeling of bandwidth due to attenuation of the high-band region.

DESCRIPTION OF EMBODIMENT

Hereinafter, an embodiment of the present invention will be described in detail with reference to the accompanying drawings.

(Embodiment)

<Overview of the Present Invention>

The present invention relates to a method of determining whether or not low-pass filter processing is necessary and a method of adaptively adjusting the amount of attenuation of an extension band region in a decoding scheme corresponding to a low bit rate scalable coding scheme. In the scalable coding scheme, it is a general practice to perform encoding with more bits assigned to the wideband region which is perceptually important, and it is therefore not preferable to apply a low-pass filter to signals of the wideband region which already has high quality. Therefore, taking advantage of the fact that a decoding scheme corresponding to a scalable coding scheme generates a decoded signal of the wideband region and a decoded signal of the extension band region independently of each other, the present invention applies a low-pass filter only to the decoded signal of the extension band region where abnormal sounds are likely to occur.

In this case, instead of applying the low-pass filter to all frames, filter processing is performed only on frames where an abnormal sound is more likely to occur. Knowledge that a drastic change of the energy of the extension band region leads to an abnormal sound feeling is used for a method of selecting a frame subject to filter processing. More specifically, by calculating average energy of the extension band region where time following performance is moderate, and comparing the energy of the extension band region with the calculated average energy for each frame, a drastic change of the energy of the extension band region is detected. A loss of feeling of bandwidth can be minimized by detecting a drastic change of the energy and applying a low-pass filter only to frames determined to have a high possibility of generating abnormal sounds.

The amount of attenuation of the low-pass filter is determined using the ratio of energy of the extension band region in the energy of the entire band of the decoded signal (hereinafter, referred to as "extension band energy ratio"). It is assumed that the higher the extension band energy ratio, the more likely abnormal sounds are to be heard, and therefore a filter coefficient of the low-pass filter is adaptively adjusted for each frame using the extension band energy ratio of the decoded signal in the current frame.

Thus, it is possible to improve sound quality by making a reduction of abnormal sounds in the extension band region compatible with continuation of a feeling of bandwidth without affecting the quality of a wideband signal in the scalable coding scheme.

<Configuration of Communication System>

Figure 1:
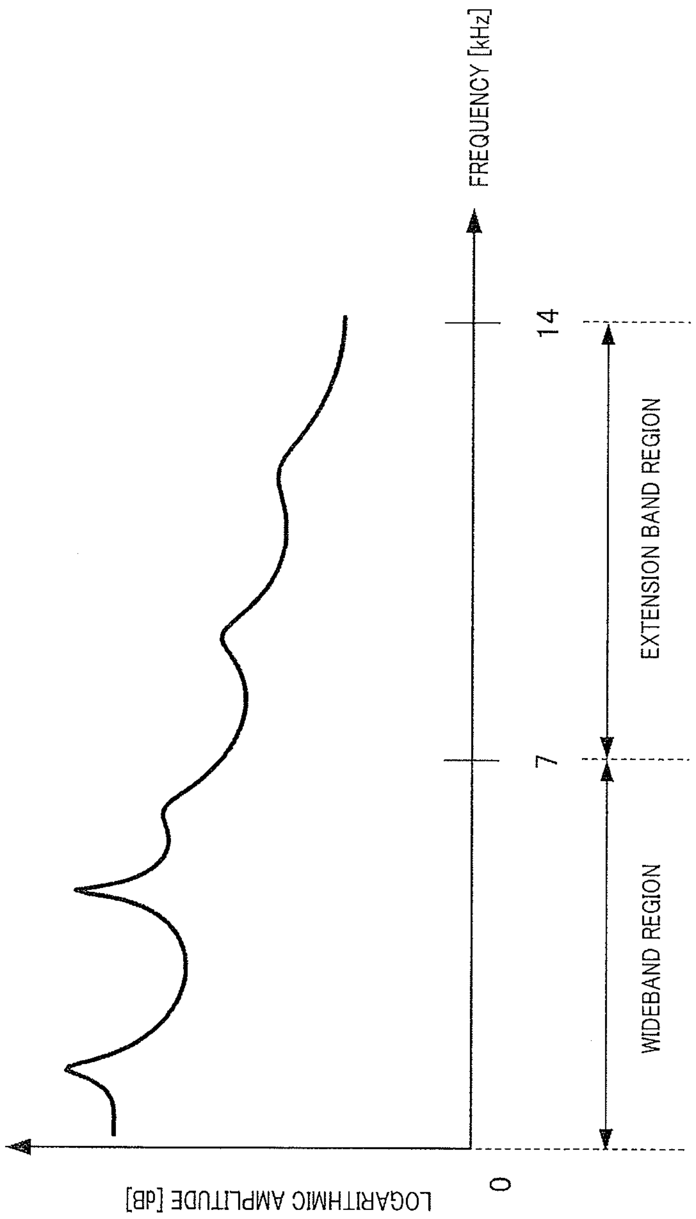
FIG. 1 illustrates a wideband region and an extension band region of an input signal spectrum.
Figure 2:
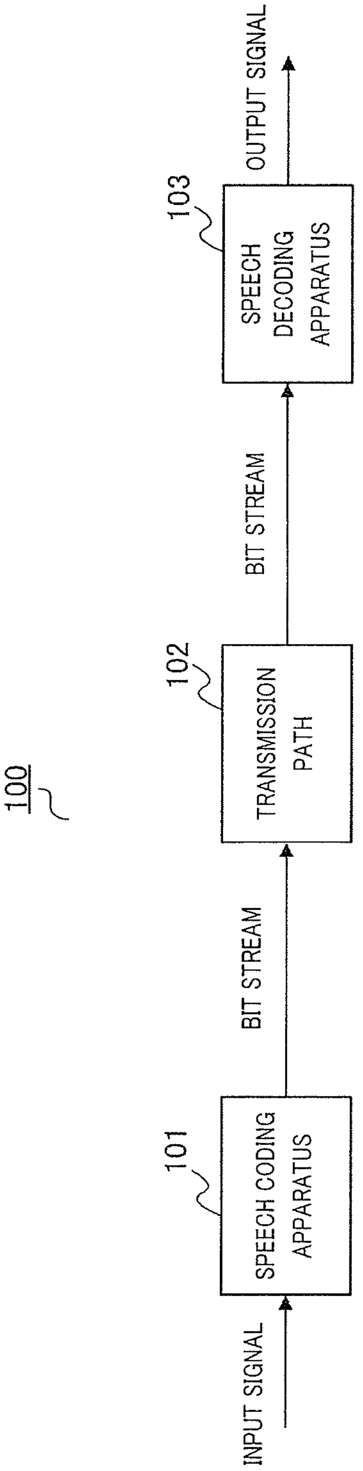
FIG. 2 is a block diagram illustrating a configuration of a communication system according to an embodiment of the present invention.

FIG. 2 is a block diagram illustrating a configuration of communication system 100 according to an embodiment of the present invention.

According to FIG. 2, communication system 100 is provided with speech coding apparatus 101 and speech decoding apparatus 103. Speech coding apparatus 101 and speech decoding apparatus 103 are communicable with each other via transmission path 102.

Speech coding apparatus 101 generates a bit stream by encoding an input signal and transmits the generated bit stream to speech decoding apparatus 103 via transmission path 102.

Speech decoding apparatus 103 receives the bit stream transmitted from speech coding apparatus 101 via transmission path 102, decodes the received bit stream and outputs the decoded bit stream as an output signal.

Both speech coding apparatus 101 and speech decoding apparatus 103 are normally mounted on a base station apparatus or a communication terminal apparatus or the like and used.

<Configuration of Speech Coding Apparatus>

Figure 3:
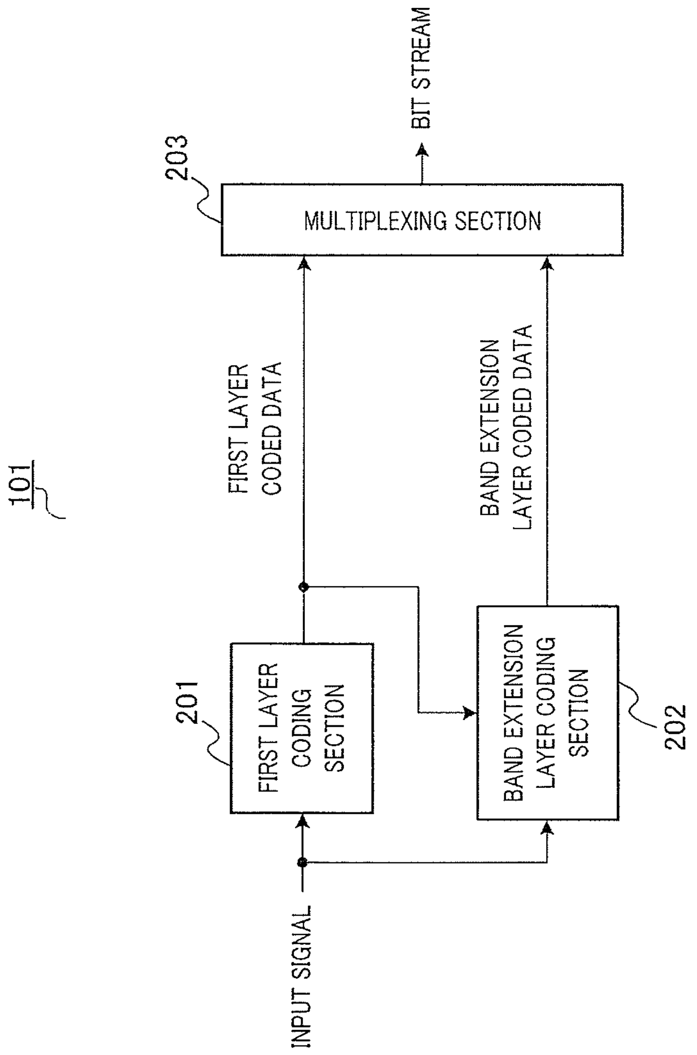
FIG. 3 is a block diagram illustrating a configuration of a speech coding apparatus according to the embodiment of the present invention.

FIG. 3 is a block diagram illustrating a configuration of speech coding apparatus 101 according to the embodiment of the present invention.

First layer coding section 201 performs coding processing on an input signal and generates first layer coded data. First layer coding section 201 outputs the generated first layer coded data to band extension layer coding processing 202 and multiplexing section 203.

Band extension layer coding processing 202 performs coding processing on an extension band region using the input signal and the first layer coded data received from first layer coding section 201 and generates band extension layer coded data. Band extension layer coding processing 202 outputs the band extension layer coded data to multiplexing section 203.

Multiplexing section 203 multiplexes the first layer coded data received from first layer coding section 201 with the band extension layer coded data received from band extension layer coding processing 202, generates a bit stream and outputs the generated bit stream to transmission path 102.

<Configuration of Speech Decoding Apparatus>

Figure 4:
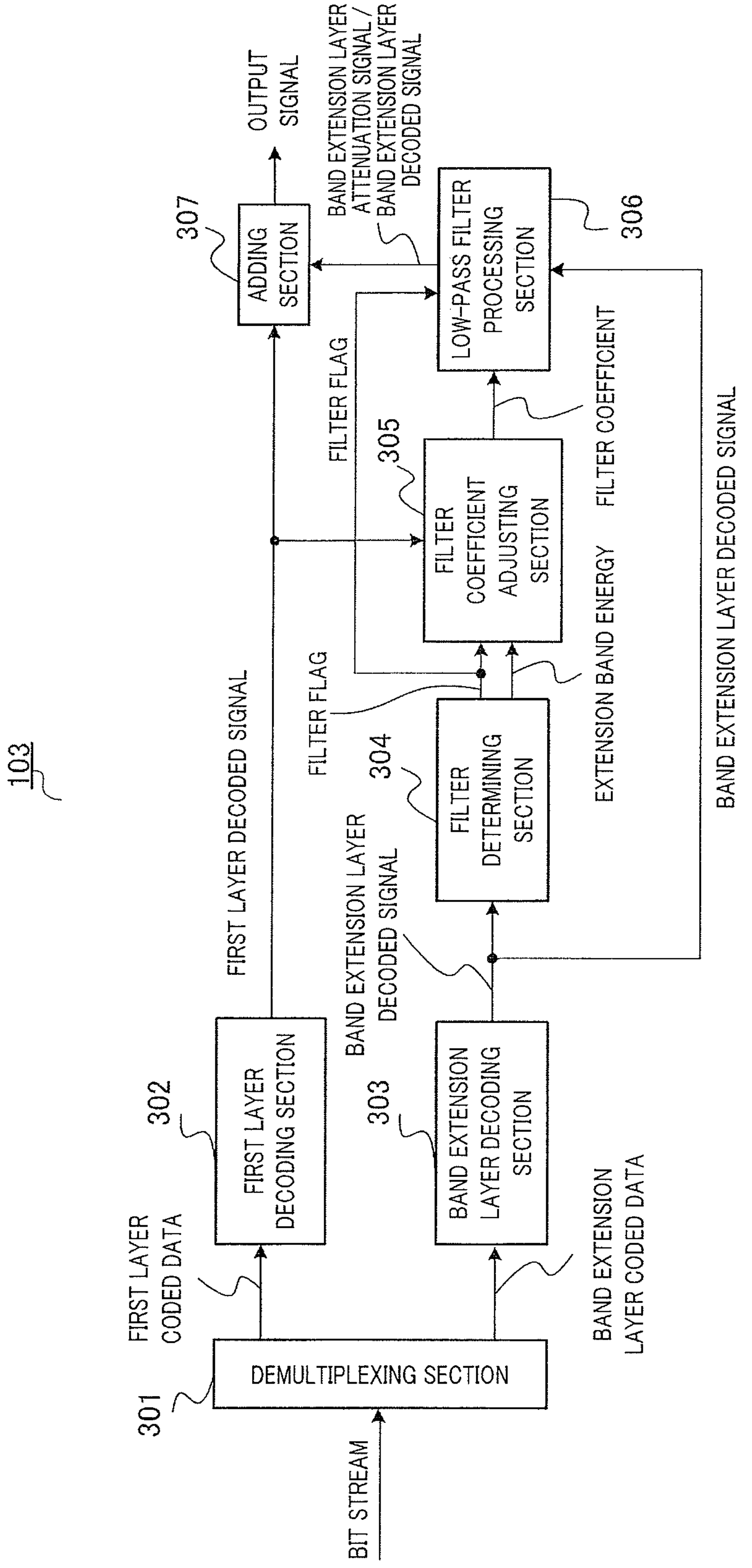
FIG. 4 is a block diagram illustrating a configuration of a speech decoding apparatus according to the embodiment of the present invention.

FIG. 4 is a block diagram illustrating a configuration of speech decoding apparatus 103 according to the embodiment of the present invention.

Demultiplexing section 301 demultiplexes the first layer coded data and the band extension layer coded data from the bit stream received from transmission path 102 (that is, coded data received from speech coding apparatus 101). Demultiplexing section 301 outputs the first layer coded data to first layer decoding section 302 and outputs the band extension layer coded data to band extension layer decoding section 303.

First layer decoding section 302 decodes the first layer coded data received from demultiplexing section 301, generates a first layer decoded signal and outputs the generated first layer decoded signal to filter coefficient adjusting section 305 and adding section 307.

Band extension layer decoding section 303 decodes the band extension layer coded data received from demultiplexing section 301, generates a band extension layer decoded signal and outputs the generated band extension layer decoded signal to filter determining section 304 and low-pass filter processing section 306.

Filter determining section 304 calculates energy of the band extension layer decoded signal received from band extension layer decoding section 303 (extension band energy). Filter determining section 304 determines the necessity of filter processing in the current frame based on an energy change in the band extension layer decoded signal received from band extension layer decoding section 303. Filter determining section 304 outputs a filter flag indicating the result of determination of the necessity of filter processing to filter coefficient adjusting section 305 and low-pass filter processing section 306 and outputs the calculated extension band energy to filter coefficient adjusting section 305. The filter flag is information indicating whether or not to perform filter processing in the current frame, and, for example, sets "1" upon determining that filter processing is performed and "0" upon determining that filter processing is not performed. Details of filter determining section 304 will be described later.

Filter coefficient adjusting section 305 adjusts a filter coefficient using the first layer decoded signal received from first layer decoding section 302, and the filter flag and extension band energy received from filter determining section 304. Filter coefficient adjusting section 305 outputs a filter coefficient to low-pass filter processing section 306 when the filter flag inputted from filter determining section 304 is "1," and outputs nothing when the filter flag inputted from filter determining section 304 is "0." Details of filter coefficient adjusting section 305 will be described later.

Low-pass filter processing section 306 performs filter processing on the band extension layer decoded signal using the band extension layer decoded signal received from band extension layer decoding section 303, the filter flag received from filter determining section 304 and the filter coefficient received from filter coefficient adjusting section 305. Low-pass filter processing section 306 performs, when the filter flag received from filter determining section 304 is "1," filter processing on the band extension layer decoded signal, generates a band extension layer attenuation signal and outputs the generated band extension layer attenuation signal to adding section 307. On the other hand, low-pass filter processing section 306 does not perform filter processing when the filter flag received from filter determining section 304 is "0," and outputs the band extension layer decoded signal received from band extension layer decoding section 303 to adding section 307 without processing. Details of low-pass filter processing section 306 will be described later.

Adding section 307 adds up the first layer decoded signal received from first layer decoding section 302 and the band extension layer attenuation signal or band extension layer decoded signal received from low-pass filter processing section 306, generates and outputs an output signal.

<Configuration of Filter Determining Section>

Figure 5:
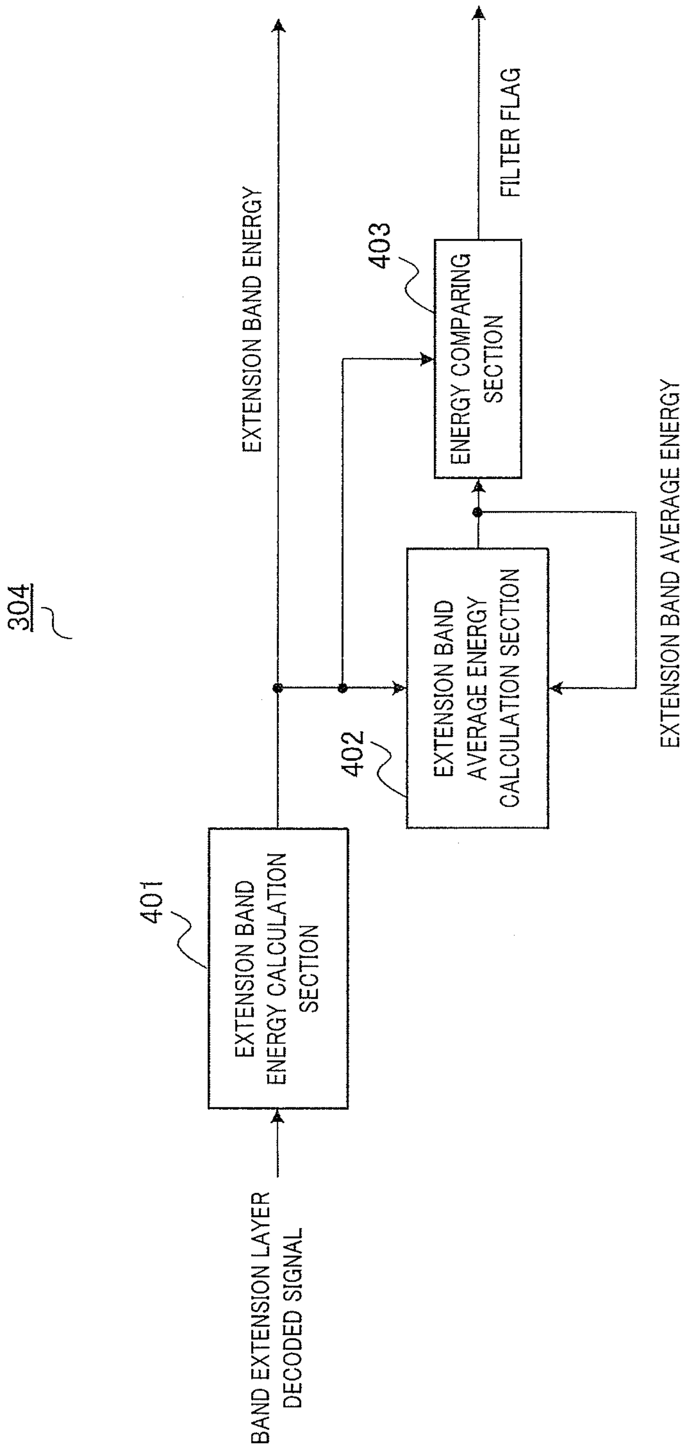
FIG. 5 is a block diagram illustrating a configuration of a filter determining section according to the embodiment of the present invention.

FIG. 5 is a block diagram illustrating a configuration of filter determining section 304 according to the embodiment of the present invention.

Extension band energy calculation section 401 calculates energy of the band extension layer decoded signal received from band extension layer decoding section 303 and outputs the calculated energy as extension band energy Ehb to extension band average energy calculation section 402, energy comparing section 403 and filter coefficient adjusting section 305.

Extension band average energy calculation section 402 recursively calculates extension band average energy Ehb_ave(n) of the current frame using extension band energy Ehb received from extension band energy calculation section 401, extension band average energy Ehb_ave(n−1) calculated in a frame preceding the current frame (n is a frame index indicating the current frame, that is, extension band average energy corresponding to the preceding frame in this case) and outputs the calculated extension band average energy Ehb_ave(n) in the current frame to energy comparing section 403.

More specifically, extension band average energy calculation section 402 calculates extension band average energy Ehb_ave(n) in the current frame according to equation 1.

[1]

$$E_{hb\_ave}(n) = \begin{cases} \alpha \cdot E_{hb} + (1-\alpha) \cdot E_{hb\_ave}(n-1) & \text{(if voiced section)} \\ E_{hb\_ave}(n-1) & \text{(otherwise)} \end{cases} \quad (1)$$

Here, $\alpha$ is a smoothing coefficient for determining the degree of smoothing of the extension band average energy and takes a value from 0 to 1. In the present invention, a smoothing coefficient on the order of $\alpha$=0.15, having low time following performance.

Energy comparing section 403 compares extension band energy Ehb received from extension band energy calculation section 401 with extension band average energy Ehb_ave(n) received from extension band average energy calculation section 402. Here, by comparing extension band energy Ehb with the extension band average energy having low time following performance calculated according to equation 1, it is possible to detect a drastic fluctuation of extension band energy Ehb.

More specifically, as shown in equation 2, energy comparing section 403 sets filter flag FF to "1" when the value obtained by subtracting the extension band average energy from the extension band energy is equal to or above threshold TH, and sets filter flag FF to "0" when the value is smaller than threshold TH.

[2]

$$FF=1 \text{ (if } E_{hb}-E_{hb\_ave}(n) \leq TH)$$

$$FF=0 \text{ (if } E_{hb}-E_{hb\_ave}(n) < TH) \quad (2)$$

When the change of the extension band energy is stationary and takes substantially the same value as the extension band average energy (that is, FF=0 in equation 2), the application of the low-pass filter can be excluded by introducing threshold TH in equation 2. This makes it possible to prevent an unnecessary loss of feeling of bandwidth.

Energy comparing section 403 outputs the set filter flag to filter coefficient adjusting section 305 and low-pass filter processing section 306.

<Configuration of Filter Coefficient Adjusting Section>

Figure 6:
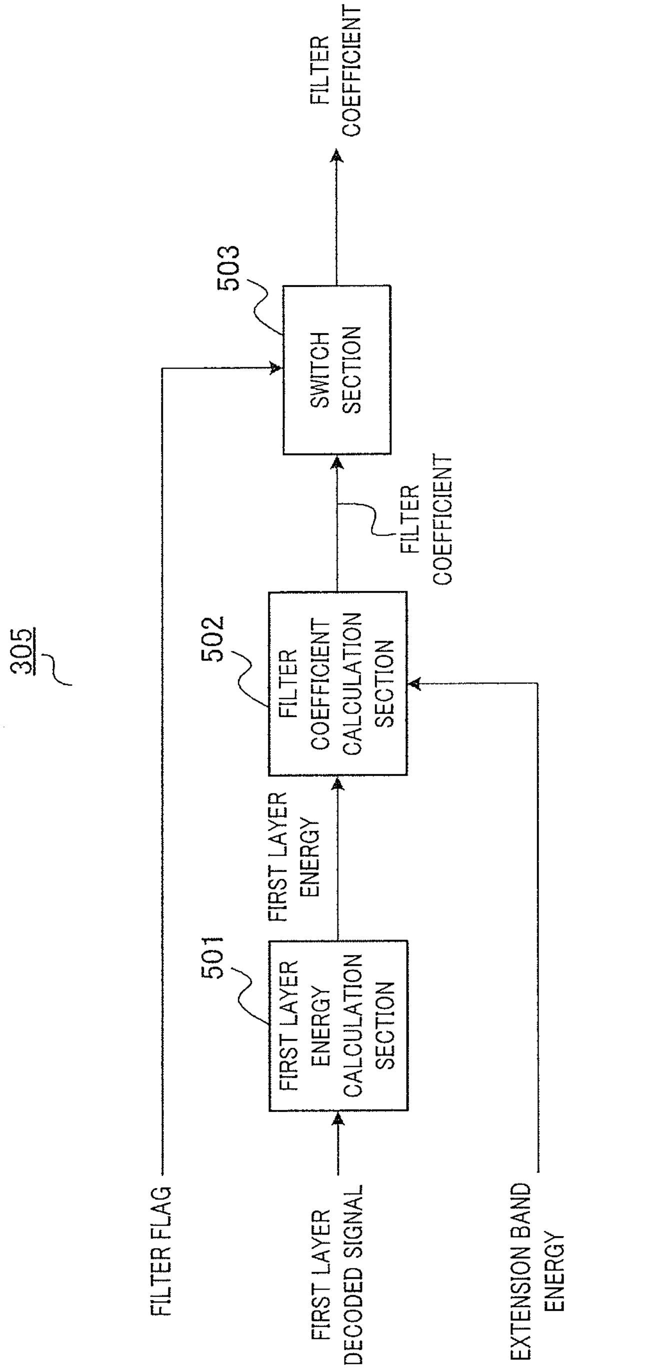
FIG. 6 is a block diagram illustrating a configuration of a filter coefficient adjusting section according to the embodiment of the present invention.

FIG. 6 is a block diagram illustrating a configuration of filter coefficient adjusting section 305 according to the embodiment of the present invention.

First layer energy calculation section 501 calculates energy of the first layer decoded signal received from first layer decoding section 302 and outputs the calculated energy as first layer energy $LB_{energy}$ to filter coefficient calculation section 502.

Filter coefficient calculation section 502 calculates extension band energy ratio HBR using first layer energy $LB_{energy}$ received from first layer energy calculation section 501 and extension band energy $HB_{energy}$ ($HB_{energy}$=Ehb) received from filter determining section 304 and adjusts the filter coefficient using calculated extension band energy ratio HBR.

HBR is calculated according to equation 3.

[3]

$$HBR=HBR_{energy}/(LB_{energy}+HB_{energy}) \quad (3)$$

HBR calculated according to equation 3 takes a value on the order of 0.37 to 0.43 in a vowel period. In an inactive period, HBR may take a value smaller than 0.37 and in a consonant period, HBR may take a value higher than 0.43.

Filter coefficient calculation section 502 outputs the adjusted filter coefficient to switch section 503. The method of adjusting the filter coefficient will be described later.

Only when the filter flag received from filter determining section 304 is "1," switch section 503 is switched on and outputs the filter coefficient received from filter coefficient calculation section 502 to low-pass filter processing section 306. On the other hand, when the filter flag received from filter determining section 304 is "0," switch section 503 is switched off and outputs nothing.

<Configuration of Low-Pass Filter Processing Section>

Figure 7:
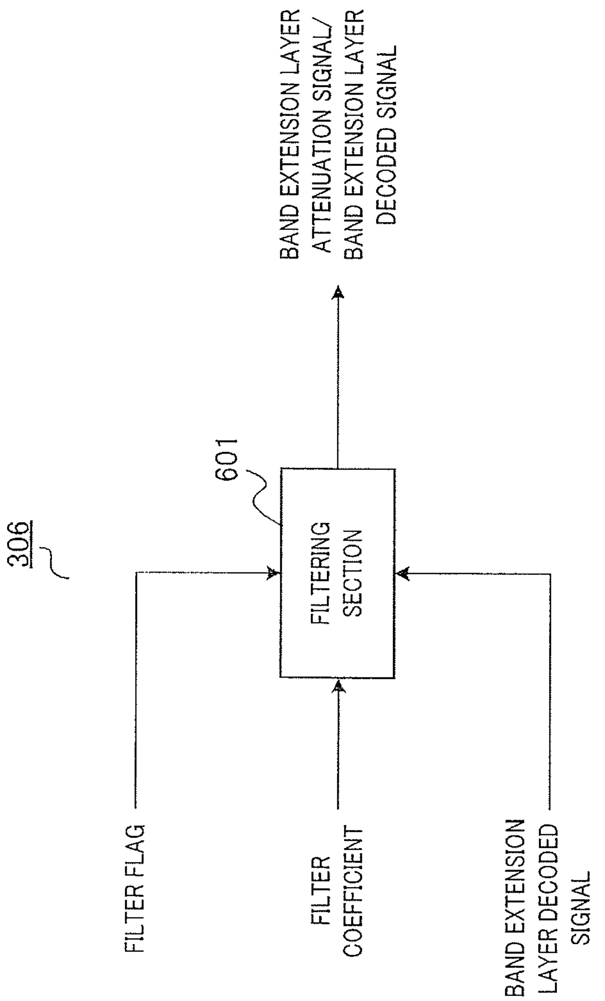
FIG. 7 is a block diagram illustrating a configuration of a low-pass filter processing section according to the embodiment of the present invention.

FIG. 7 is a block diagram illustrating a configuration of low-pass filter processing section 306 according to the embodiment of the present invention.

Filtering section 601 performs low-pass filter processing on the band extension layer decoded signal received from band extension layer decoding section 303 using the filter coefficient received from filter coefficient adjusting section 305. In this case, when the filter flag received from filter determining section 304 is "1," filtering section 601 performs low-pass filter processing, generates a band extension layer attenuation signal and outputs the generated extension band layer attenuation signal to adding section 307. On the other hand, when the filter flag received from filter determining section 304 is "0," filtering section 601 does not perform low-pass filter processing and outputs the band extension layer decoded signal received from band extension layer decoding section 303 to adding section 307 without processing.

<Filter Adjusted by Filter Coefficient Adjusting Section>

The filter adjusted by filter coefficient adjusting section 305 is, for example, a primary FIR (finite impulse response) filter and is configured of filter coefficients $\beta$ and $\gamma$ as defined by equation 4.

[4]

$$A(z)=\beta\cdot(1+\gamma\cdot z^{-1}) \quad (4)$$

These filter coefficients $\beta$ and $\gamma$ are calculated, for example, according to equation 5 and equation 6.

[5]

$$\beta=1-coef_1\cdot HBR \quad (5)$$

$$\gamma=coef_2\cdot \max(HBR-TH_{Low}, 0) \quad (6)$$

where max(A, B) is a function that compares A and B and returns the greater value of the two.

$TH_{LOW}$ is a threshold that sets a minimum value of HBR in a voiced period and is on the order of $TH_{LOW}$=0.37.

In addition, $coef_1$ and $coef_2$ are positive constants and are on the order of $coef_1$=1.045, $coef_2$=7.576

Thus, in consideration of possible values that can be taken by aforementioned HBR and $TH_{LOW}$, filter coefficient $\beta$ in the vowel period takes a value of 0.55 to 1 and filter coefficient $\gamma$ takes a value on the order of 0 to 0.46. Thus, the filter expressed by equation 4 is a low-pass filter.

From equation 5 and equation 6, filter coefficient $\beta$ is adjusted so as to take a smaller value as HBR increases and filter coefficient $\gamma$ is adjusted so as to take a greater value as HBR increases. Thus, as HBR increases, the gain of the designed low-pass filter decreases and the amount of attenuation increases. That is, this means that as HBR takes a greater value, extension band energy attenuates to a greater extent.

As described above, filter coefficients $\beta$ and $\gamma$ are combined to adjust the filter characteristics of the low-pass filter in order to obtain a desired amount of attenuation even when a low-order filter is used. Although the low-pass filter processing using a primary FIR filter is low calculation processing, since it is low-order, the amount of attenuation attained by adjustment of filter coefficient $\gamma$ alone is insufficient. Thus, filter coefficient $\beta$ is introduced and filter coefficient $\beta$ is adjusted so as to become smaller as HBR increases. Thus, the gradient (attenuation characteristic) of the filter can be adjusted by filter coefficient $\gamma$ and further the overall gain can be reduced by filter coefficient $\beta$, and a desired amount of attenuation can thereby be obtained.

<Effects of the Present Embodiment>

According to the present embodiment, it is possible to prevent degradation of sound quality associated with an adjustment of the spectral tilt of the output signal (decoded signal) and make less perceptible a loss of feeling of bandwidth associated with attenuation of the high-band region.

According to the present embodiment, when the low-pass filter is applied, low-pass filter processing is applied to only the decoded signal of the extension band region, and it is thereby possible to maintain the quality of the decoded signal of the wideband region.

According to the present embodiment, instead of performing low-pass filter processing in all frames, low-pass filter processing is performed only in selected frames, and a loss of feeling of bandwidth by low-pass filter processing can be limited to the selected frames.

According to the present embodiment, since the characteristics of the low-pass filter are adaptively adjusted according to the extension band energy ratio per frame, and it is thereby possible to minimize a loss of feeling of bandwidth in frames to which low-pass filter processing is applied.

<Variations of the Present Embodiment>

In the above-described embodiment, although the filter coefficient is adjusted so that signals attenuate to a greater extent as HBR increases, the present invention is not limited to this, and upper limit value $TH_{HIGH}$ may be set for the HBR value and the filter coefficient may be calculated only when HBR takes a value of $TH_{LOW}$ to $TH_{HIGH}$. When a consonant is voiced, HBR generally increases and so when HBR exceeds $TH_{HIGH}$, the period is determined as a consonant period. When the period is determined as a consonant period, the feeling of clarity of an output speech (decoded signal) can be maintained by preventing the low-pass filter from operating.

In the above-described embodiment, the smoothing coefficient in equation 1 is assumed to be a constant, but the present invention is not limited to this and the smoothing coefficient in equation 1 may be changed depending on whether a period is a rising period (onset period), falling period (offset period), stationary period or inactive period of a speech or the like. More specifically, for a period such as a rising period or falling period during which the energy of a speech drastically changes, a high smoothing coefficient is set to increase the time following performance of the extension band average energy and for a stationary period, a low smoothing coefficient is set. For an inactive period, when the extension band average energy is updated, the extension band average energy decreases and filter processing is always performed for the rising period that follows. In order to prevent this, the smoothing coefficient is set to "0" and the extension band average energy is not updated.

In addition, the smoothing coefficient may also be switched depending on whether a period is a vowel period or consonant period of a speech. More specifically, the smoothing coefficient is set to a certain value during a vowel period, and the smoothing coefficient is set to "0" during a consonant period, and the extension band average energy is not updated. In this way, a temporary increase of the extension band energy in the consonant period can be excluded from calculations of the extension band average energy.

In the above-described embodiment, threshold TH in equation 2 is assumed to be a constant, but the present invention is not limited to this, and threshold TH in equation 2 may also be adaptively changed in accordance with, for example, HBR. More specifically, threshold TH is set so that threshold TH is decreased as HBR increases and threshold TH is increased as HBR decreases.

In the above-described embodiment, the filter coefficient is calculated according to equation 5 and equation 6, but the present invention is not limited to this, and the filter coefficient may also be calculated using a table corresponding to HBR. In this case, the table is set so that filter coefficient $\beta$ is increased and filter coefficient $\gamma$ is decreased as the HBR value increases.

In the above-described embodiment, the filter designed in filter adjusting section 305 is assumed to be a primary filter, but the present invention is not limited to this, and a filter whose order is higher than the primary may also be used. The type of filter is not limited to FIR, and an IIR (infinite impulse response) filter may also be used.

In the present invention, when the filter flag is "0," filter coefficient adjusting section 305 may set filter coefficient $\beta=1$ and filter coefficient $\gamma=0$ and may output these coefficients to low-pass filter processing section 306.

In the above-described embodiment, the present invention is applied to a decoding scheme corresponding to the scalable coding scheme, but the present invention is not limited to this, and the present invention is also applicable to a decoding scheme corresponding to a coding scheme which is not the scalable configuration.

The present invention is also applicable to a scalable configuration with three or more layers.

In the above-described embodiment, both a speech signal and a music signal are included as input signals but the present invention is suitable for a speech signal in particular.

In the embodiment described above, the present invention is configured using hardware by way of example, but the invention may also be provided by software in concert with hardware.

In addition, the functional blocks used in the description of the embodiment are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

The disclosure of the specification, the drawings, and the abstract included in Japanese Patent Application No. 2012-010264 filed on Jan. 20, 2012 is incorporated herein by reference in their entirety.

INDUSTRIAL APPLICABILITY

The present invention is suitable for a speech decoding apparatus and a speech decoding method that have a scalable configuration, for example.

REFERENCE SIGNS LIST

103 Speech decoding apparatus
301 Demultiplexing section
302 First layer decoding section
303 Band extension layer decoding section
304 Filter determining section
305 Filter coefficient adjusting section
306 Low-pass filter processing section
307 Adding section

The invention claimed is:

1. A speech decoding apparatus, comprising:

a memory that stores instructions; and a processor that executes the instructions, wherein, when executed by the processor, the instructions cause the processor to perform a process comprising:

acquiring first layer coded data obtained by encoding a speech signal of a wideband region and band extension layer coded data obtained by encoding a speech signal of an extension band region that is a higher band than the wideband region;

decoding the acquired first layer coded data to generate a first layer decoded signal and decoding the acquired band extension layer coded data to generate a band extension layer decoded signal;

determining for each frame of the band extension layer decoded signal whether to apply a low-pass filter to the band extension layer decoded signal;

performing filter processing on the band extension layer decoded signal of the frame to which the low-pass filter will be applied, and calculating energy of the band extension layer decoded signal for each of the frames of the band extension layer decoded signal, and when a difference between energy of the band extension layer decoded signal of the current frame and average energy of the band extension layer decoded signal up to the current frame is equal to or greater than a threshold, determining that the low-pass filter will be applied to the band extension layer decoded signal of the current frame.

2. The speech decoding apparatus according to claim 1, wherein the process performed by the processor further comprises adaptively changing a filter coefficient of the low-pass filter using an energy ratio indicating a ratio of energy of the extension band region in energy of an entire band including the wideband region and the extension band region, the energy ratio being calculated using energy of the first layer decoded signal and energy of the band extension layer decoded signal, wherein the filter coefficient is adjusted such that a gain of the low-pass filter decreases and an amount of attenuation increases as the ratio of energy increases; and wherein the filter processing is performed using the adjusted filter coefficient.

3. A speech decoding method comprising:

acquiring, by a speech processing apparatus comprising a memory that stores instructions and a processor that executes the instructions, first layer coded data obtained by encoding a speech signal in a wideband region and band extension layer coded data obtained by encoding a speech signal in an extension band region which is higher band than the wideband region;

decoding the acquired first layer coded data to generate a first layer decoded signal and decoding the acquired band extension layer coded data to generate a band extension layer decoded signal;

determining for each frame of the band extension layer decoded signal whether to apply a low-pass filter to the band extension layer decoded signal; and performing filter processing on the band extension layer decoded signal of the frame to which the low-pass filter will be applied;

calculating energy of the band extension layer decoded signal for each of the frames of the band extension layer decoded signal, and when a difference between energy of the band extension layer decoded signal of the current frame and average energy of the band extension layer decoded signal up to the current frame is equal to or greater than a threshold, determining that the low-pass filter will be applied to the band extension layer decoded signal of the current frame.

* * * * *